Figure 1:
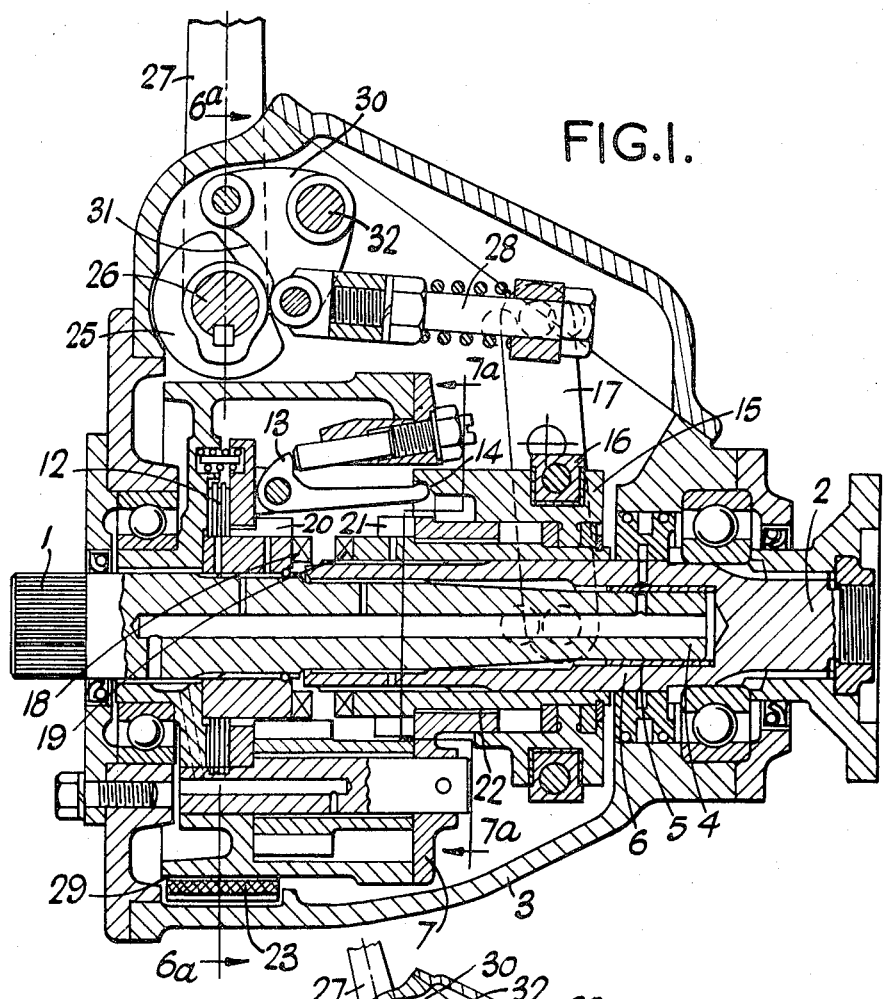

United States Patent
Chamberlain

[15] 3,680,409
[45] Aug. 1, 1972

[54] REVERSIBLE TRANSMISSION WITH FRICTION AND POSITIVE CLUTCHES

[72] Inventor: Alan Hawker Chamberlain, 95 Dow St., Toorak, Victoria, Australia

[22] Filed: Nov. 12, 1970

[21] Appl. No.: 88,966

[30] Foreign Application Priority Data

Nov. 13, 1969 Australia ................... 63754/69

[52] U.S. Cl. ................... 74/792, 192/3.52, 192/53 B
[51] Int. Cl. ................................................. F16k 15/56
[58] Field of Search ................... 74/792; 192/3.52

[56] References Cited

UNITED STATES PATENTS

| | | | |
|---|---|---|---|
| 2,414,832 | 1/1947 | Orr | 74/792 |
| 2,264,031 | 11/1941 | Ware et al. | 74/792 |
| 2,286,223 | 6/1942 | Nabstedt | 74/792 |
| 2,883,021 | 4/1959 | Hill | 74/792 X |

Primary Examiner—Benjamin W. Wyche
Attorney—Pollock, Philpot, Sande, Priddy, King, Amernick & Green

[57] ABSTRACT

A reversible power transmission comprising input and output shafts, a planetary gear train coupled to the input shaft and incorporating a friction clutch operable to effect transmission of light torque loads to the output shaft without change in the direction of rotation, and a dog clutch operable in sequence with the friction clutch to couple the input and output shafts after engagement of friction clutch to transmit heavy torque loads.

4 Claims, 7 Drawing Figures

REVERSIBLE TRANSMISSION WITH FRICTION AND POSITIVE CLUTCHES

This invention relates to a reversible transmission and particularly a transmission for incorporation in marine craft between the engine and the propeller. The convenient operation of propeller driven marine craft requires the use of a transmission which will enable the craft to be propelled forward or backwards, and also enable the engine to be maintained running without driving the propeller.

A variety of transmissions have been used in marine craft ranging from a simple dog clutch or friction clutch to hydraulically actuated planetary gear boxes. The dog clutch type transmission has the advantage of being of simple and light-weight construction in comparison with the torque capacity, but they are harsh in their operation and impart heavy shock loadings to all components of the drive. Transmissions employing cone-type friction clutches, eliminate the shock loadings derived with dog clutches, but become large in size when high torques are to be transmitted. Similarly with the planetary gear box employing clutches and brakes, the size and weight of the transmission increases rapidly with increases in torque. Also in high torque transmissions it is common to employ hydraulic actuation of the clutches and brakes, which further increases the size of the transmission and requires additional equipment such as oil pumps and coolers.

It is the object of the present invention to provide a reversible transmission which is of light and compact construction, and is capable of transmitting relatively high torques with minimum shock loadings.

With the above stated object in view, there is provided according to the present invention a reversible power transmission comprising a drive shaft and driven shaft, a planetary gear train coupling the drive shaft to the driven shaft, said planetary gear train including a friction clutch and a friction brake arranged so that selective engagement of the clutch or brake establish opposite directions of drive of the driven shaft, dog clutch means selectively operable to drive couple the drive and driven shafts, and actuator means operable to engage the friction and dog clutches in sequence in that order.

More specifically there is provided a reversible power transmission comprising a housing, an input and an output shaft journalled coaxially in the housing, an input gear and an output gear drive coupled to the input and output shafts respectively, a planetary gear carrier journalled in the housing coaxial with the shafts, a friction clutch operable to selectively drive couple the input shaft to the planetary gear carrier, a brake operable to selectively lock the carrier stationary, planetary gears journalled on the carrier and arranged to drive the output shaft in the same direction as the input shaft when the carrier is drive coupled to the input gear and to drive the output shaft in opposite direction to the input shaft when the carrier is locked stationary, dog clutch means selectively operable to drive couple the input and output shafts, and actuator means operable to engage the friction and dog clutches in sequence in that order.

This construction of reversible transmission has the advantage of a friction clutch transmission in providing smooth engagement and the advantage of a dog clutch transmission for transmitting high torques. Initial engagement of the friction clutch brings the output shaft up to the speed of the input shaft so that the dog clutch may be engaged smoothly without shock loadings on the transmission. It will be appreciated that the friction clutch is only required to operate at or near idling speeds when the torque required by the propeller is very low. Thus the friction clutch is of small size and long life.

Conveniently the planetary gears comprise a pair of first planetary gears driven by the input gear and disposed in diametrically opposite positions in the carrier. Each first planetary gear drives respective second planetary gears, also supported by the carrier in diametrically opposite relation, and each driving the output gear. Engagement between the second planetary gears and the output gear is maintained during sliding movement of the output gear to effect engagement and disengagement of the dog clutches.

The actuating means includes a spring loaded lever so that if the dog clutches do not engage when the actuating means is first operated, the spring is compressed whereby the final movement of the dog clutch member will be effected under the spring pressure when there is relative rotation between the dog clutch members to permit engagement thereof.

Figure 2:
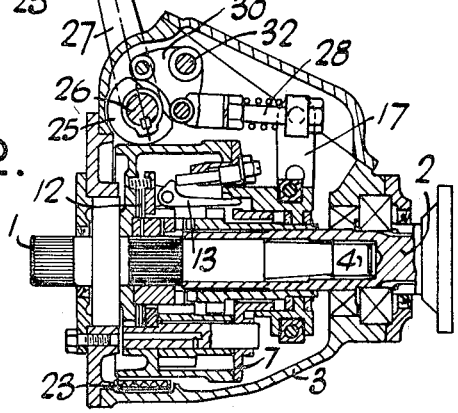
Figure 3:
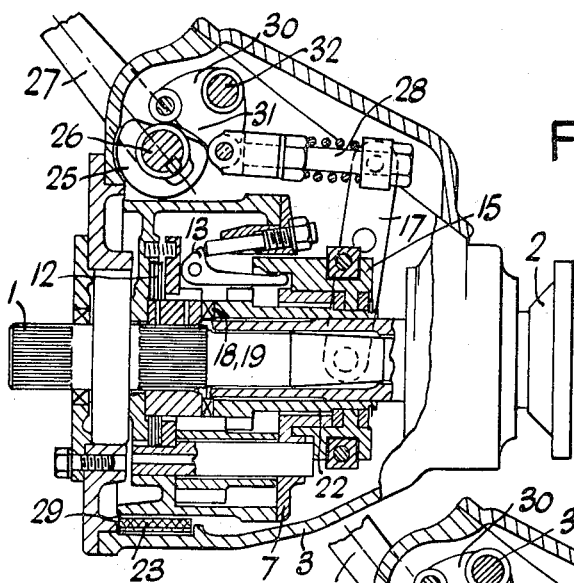
Figure 4:
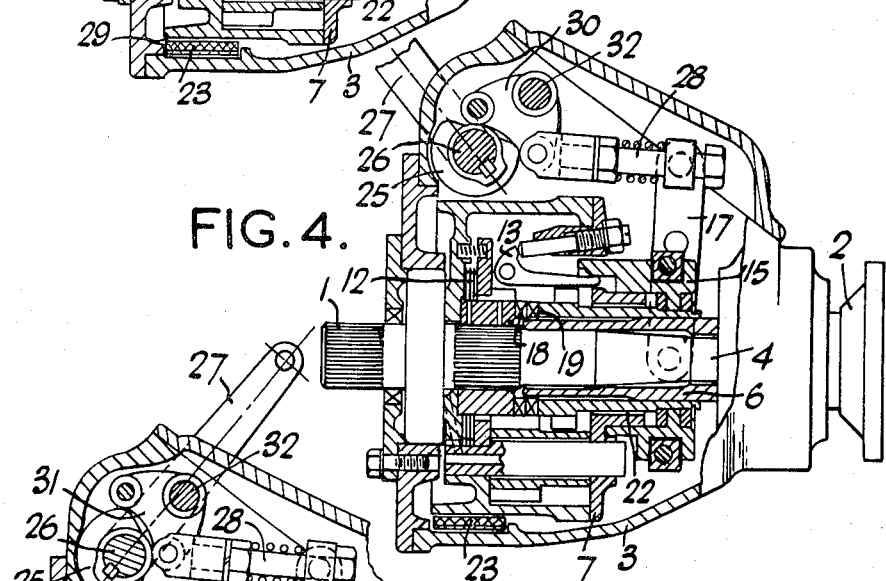
Figure 5:
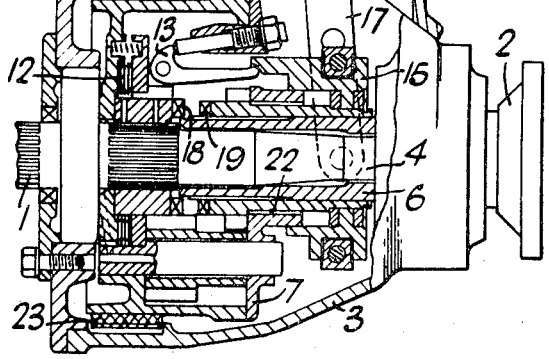
Figure 6:
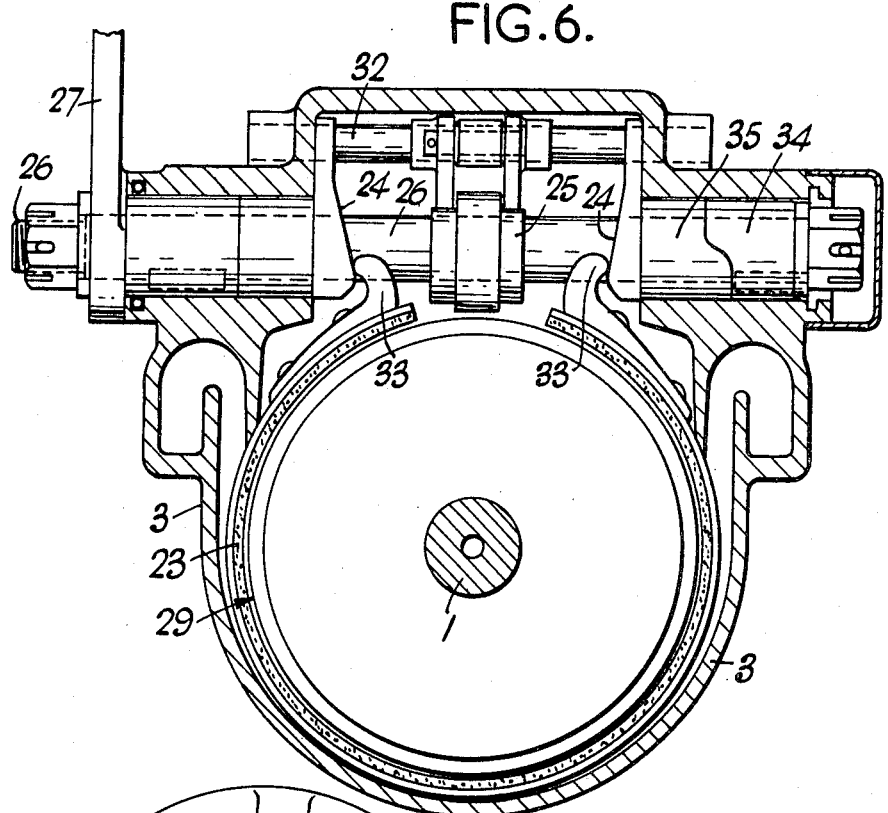
Figure 7:
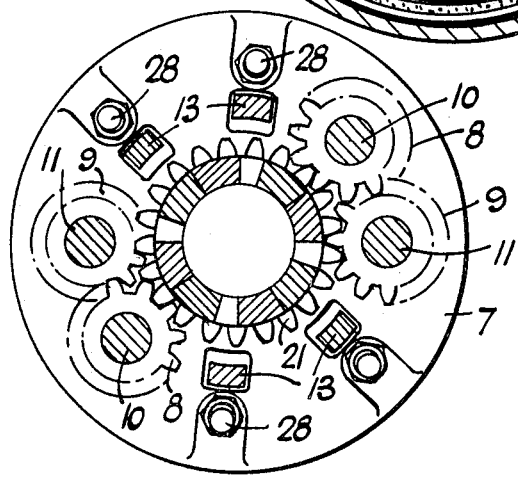

The invention in a preferred form will now be described with reference to the following drawings in which:

FIG. 1 shows a longitudinal vertical section of a reversible transmission according to the present invention in the neutral or no drive position, FIGS. 2 – 4 show various stages in the operation of the transmission from a neutral to forward drive position, FIG. 5 shows the transmission in the reverse drive position, FIG. 6 shows a transverse section of the transmission taken along the line shows as 6a – 6a in FIG. 1 in the direction of the arrows, and FIG. 7 shows a transverse section of the transmission taken along the line 7a – 7a in FIG. 1 in the direction of the arrows.

Referring now to FIGS. 1, 6 and 7, the transmission comprises the input shaft 1 and output shaft 2 journalled coaxially in the transmission housing 3 with the inner-end 4 of the input shaft 1 supported in bushes 5 in the hollow inner/-end 6 of the output shaft 2. The planetary gear carrier 7, in the form of a cylindrical housing, is journalled coaxial with the input and output shafts with input and output gears 20 and 21 drivably mounted on the respective shafts disposed within the carrier. The multiplate friction clutch 12 is arranged to provide selective coupling of the input drive gear 20 to the carrier 7, and is operated by a plurality of fingers 13 of known construction which co-operate with the cam surface 14 on the sleeve 15 axially slidable on the output shaft. The axial movement of the sleeve is effected through a conventional thrust ring 16 and actuating fork 17 from the cam 25 as described hereinafter.

The rear diametrical face of the input drive gear 20 is provided with a plurality of dog clutch teeth 18, with corresponding teeth 19 being provided on the forward diametrical face of the output drive gear 21. The output drive gear 21 is axially slidable on splines 22 on the output shaft 2, this movement also being effected by the sleeve 15 which operates the clutch fingers 13.

The relative arrangement of the friction clutch fingers 13, the dog clutch teeth 18 and 19, and the sliding sleeve 15 are such that as the sleeve is moved axially towards the input drive gear 20, the clutch fingers are first operated to fully engage the friction clutch 12 and thereafter further movement of the sleeve 15 bring the dog clutch teeth 18 and 19 into engagement.

First and second pairs of planetary gears 8 and 9, are mounted on respective shafts 10 and 11 located within the cylindrical housing forming the planetary carrier 7. The respective gears of each pair are in constant mesh with each other and the first gears are in constant mesh with the input drive gear, and the second gears with the output drive gears. The friction brake band 23 is mounted within the transmission housing 3 about the periphery of the carrier 7 and is operable by the interengaging members 33 and 24 and the cam 34 to selectively grip the planetary carrier and prevent rotation thereof. The prevention of rotation of the carrier results in a drive being established from the input drive gear 20 to the output drive gear 21 through the pairs of first and second planetary gears 8 and 9, which reverses the direction of rotation of the output shaft relative to the input shaft.

Referring now also to FIG. 6 the brake band 23 and the pivoted fork 17 effecting sliding movement of the sleeve 15 are actuated by respective cams 34 and 25 mounted on a common actuating shaft 26 journalled in the housing 3 and rotated by a control lever 27. The cam 25 co-operates with the bell-crank 30 pivotally mounted to a shaft 32 in the housing and having cam engaging portions 31. The rod 28 is connected to the bell-crank 30 and the fork 17. The rod 28 is slidable relative to the fork against the pressure of the spring 28a. The cam 34 fixed to the shaft 26 and the boss 35 on the member 24a have co-operating caming faces.

The cams 34 and 35 are arranged so that when the shaft is in a central neutral position as shown in FIG. 1, the brake is released and both the friction clutch and dog clutches are disengaged, so that there is no drive from the input to the output shaft. When the actuating shaft 26 is partially rotated in one direction to the position shown in FIG. 2, it engages in sequence the multi-plate friction clutch 12 and the dog clutch to establish uni-directional drive from the input shaft to the output shaft and when partially rotated in the opposite direction from the neutral position (not shown), the cam 34 moves the member 24a axially on the shaft 26 to close the band 23 about the carrier 7 to establish a reverse drive from the input to the output shaft.

The sequential engagement of the friction clutch and dog clutch results in the output shaft 2 being brought up to the speed of the input shaft 1 when the friction clutch is engaged, whereby subsequent engagement of the dog clutch is effected smoothly without the impact loads normally encountered with dog clutches.

The operation of the transmission is now described in more detail with reference to the sequential FIGS. 1 – 4 showing forward drive. Initial forward movement of the control lever 27 to the position shown in FIG. 2 pivots the bell crank and hence the fork 17 to effect axial movement of the sleeve 15 which in turn effects axial movement of the output drive gear 21 toward the input gear 20. During the same movement the sleeve engages the fingers 13 operating the friction clutch 12, the first part of the axial movement of the sleeve engages this clutch thereby causing the output shaft 2 to be rotated at the same speed and in the same direction as the rotating input shaft 1.

At the time of this friction clutch engagement the engine is driving the input shaft at idling or near idling speed and very little torque needs to be transmitted. Further movement of the control lever to the position shown in FIG. 3 causes further movement of the axially movable sleeve 15, which is also connected to the output drive gear 21 thereby sliding this gear until the dogs 19 at the face of the gear engage the dogs 18 at the face of the input drive gear. Engagement of these dogs permits transmission of power directly from the input shaft to the output shaft by locking these shafts together, permitting the transmission of very high torque (and power) without any possibility of slip.

It is possible that under some circumstances the dogs may be in such a rotatable relationship that they ride on top of each other and cannot engage. The sliding connection between the rod 28 and fork 17 permits the control lever 27 to be moved into the fully forward position shown in FIGS. 3 and 4 but, as the dogs cannot engage, they are held together under heavy spring pressure, arising from compression of the spring 28a which causes the dogs to engage as soon as the torque being transmitted exceeds the torque capacity of the small friction clutch 12. The small amount of rotational movement between input and output shafts required to engage the dogs does not cause any noticeable effect on the transmission and, as it takes place only when very low torque is being transmitted, the shock loadings are negligible.

It will be apparent that a straight through drive incorporating only simple robust parts carries the torque directly from input shaft to output shaft under all conditions of forward drive except on initial engagement of the drive when the torque is very low and is taken through the small friction clutch.

Rearward motion of the control lever back to the neutral (or no drive) position shown in FIG. 1 causes the drive dogs to be disengaged then the small friction clutch to be disengaged. It is to be noted that the rearward movement of the control lever effects a positive disengagement of the clutches due to the contour of the cam 25 and the engagement therewith of both arms of the bell crank 30. The disengagement of drive takes place when the engine power (and torque) has been reduced to idling (or near idling) conditions and is accomplished with very low loadings.

Further rearward movement of the control lever past the neutral position to the position shown in FIG. 5 brings into operation the simple cam 34 (shown in FIG. 6) which causes the band brake 23 to be applied to the outer surface 29 of the planetary gear carrier 7 thereby locking this assembly against rotation. Under these circumstances the input drive gear drives the output drive gear through the planetary gears 8 and 9 causing the drive from input shaft to output shaft to be transmitted in opposite direction of rotation thereby rotating the propeller in reverse.

Movement of the control lever may be by hand, or power assisted. A convenient, cheap and simple means of operation (not shown) is by means of a piston (or rolling rubber diaphragm) under influence of engine intake manifold pressure, a simple valve being provided to apply thrust on the actuating member in the desired direction. Such a valve requires very low effort for movement and can conveniently be operated by one of the popular single lever marine control systems.

I claim:

1. A reversible power transmission comprising a housing, an input and an output shaft journalled coaxially in said housing, an input gear and an output gear drive coupled to said input and output shafts respectively, a planetary gear carrier journalled in said housing coaxial with said shafts, a friction clutch operable to selectively drive couple said input shaft to said planetary gear carrier, a brake operable to selectively lock said carrier stationary, planetary gears journalled on said carrier and arranged to drive said output shaft in the same direction as said input shaft when said carrier is drive coupled to said input gear and to drive said output shaft in opposite direction to said input shaft when said carrier is locked stationary, dog clutch means selectively operable to drive couple said input and output shafts, and actuator means operable to engage said friction and dog clutches in sequence in that order, said planetary gears comprising a pair of first planetary gears driven by said input gear and disposed in diametrically opposite positions in said carrier, each of said first planetary gears being in driving engagement with a respective second planetary gear also supported by said carrier in diametrically opposed relation, each of said second planetary gears driving said output gear, and engagement between said second planetary gears and said output gear being maintained during sliding movement of said output gear to effect engagement of said dog clutch.

2. A reversible power transmission comprising a housing, an input and an output shaft journalled coaxially in said housing, an input gear and an output gear drive coupled to said input and output shafts respectively, a planetary gear carrier journalled in said housing coaxial with said shafts, a friction clutch operable to selectively drive couple said input shaft to said planetary gear carrier, a brake operable to selectively lock said carrier stationary, planetary gears journalled on said carrier and arranged to drive said output shaft in the same direction as said input shaft when said carrier is drive coupled to said input gear and to drive said output shaft in opposite direction to said input shaft when said carrier is locked stationary, dog clutch means selectively operable to drive couple said input and output shafts, and actuator means operable to engage said friction and dog clutches in sequence in that order, said actuator means comprising a sleeve mounted for axial sliding movement relative to said input gear, a plurality of clutch actuating fingers operatively interposed between said friction clutch and said sleeve to engage said friction clutch in response to axial movement of said sleeve in one direction relative to said input gear, and said dog clutch means comprising complementary formations of dog clutch teeth drive coupled to said input and to said output shaft being axially slidable relative thereto in response to axial movement of said sleeve to engage and disengage said tooth formation coupled to said input shaft, the relative arrangement of said dog teeth formations, said friction clutch fingers, and said sleeve being such that axial movement of said sleeve in said one direction first effects engagement of said friction clutch and then effects engagement of said dog teeth formations.

3. A reversible power transmission as claimed in claim 2 wherein the axial movement of the sleeve is effected by a lever mounted for angular movement relative to the housing and a linkage mechanism interposed between the lever and the sleeve, the linkage being arranged to engage the clutches in sequence upon angular movement of the lever in one direction from a neutral position and to disengage the clutches upon return to said neutral position, said lever also being operably connected to the brake to actuate the brake upon angular movement in the opposite direction from said neutral position.

4. A reversible power transmission comprising a housing, an input and an output shaft journalled coaxially in said housing, a planetary gear carrier journalled in said housing coaxial with said shafts, a friction clutch operable to selectively drive couple said input shaft to said planetary gear carrier, a brake operable to selectively lock said carrier stationary, planetary gears journalled on said carrier and arranged to drive said output shaft in the same direction as said input shaft when said carrier is drive coupled to said input shaft by said friction clutch and to drive said output shaft in opposite direction to said input shaft when said carrier is locked stationary, dog clutch means selectively operable to directly drive couple said input and output shafts, and actuator means operable to engage said friction and dog clutches in sequence in that order to first drive couple said input and output shafts through said planetary gear and thereafter direct couple said shafts through said dog clutch.

* * * * *

PO-1050
(5/69)

UNITED STATES PATENT OFFICE
CERTIFICATE OF CORRECTION

Patent No. 3,680,409      Dated August 1, 1972

Inventor(s) Alan Hawker Chamberlain

It is certified that error appears in the above-identified patent and that said Letters Patent are hereby corrected as shown below:

In the Heading change the inventor's address to:

-- 32A Lansell Road, Toorak, Victoria, Australia --

Signed and sealed this 6th day of February 1973.

(SEAL)
Attest:

EDWARD M. FLETCHER, JR.            ROBERT GOTTSCHALK
Attesting Officer                 Commissioner of Patents